United States Patent
Zhang

(10) Patent No.: US 12,476,557 B2
(45) Date of Patent: Nov. 18, 2025

(54) AC-DC POWER SUPPLY

(71) Applicant: Lithium Balance A/S, Smorum (DK)

(72) Inventor: Zhe Zhang, Lyngby (DK)

(73) Assignee: Lithium Balance A/S, Smorum (DK)

(*) Notice: Subject to any disclaimer, the term of this patent is extended or adjusted under 35 U.S.C. 154(b) by 391 days.

(21) Appl. No.: 18/012,597

(22) PCT Filed: Jun. 24, 2021

(86) PCT No.: PCT/EP2021/067303
§ 371 (c)(1),
(2) Date: Dec. 22, 2022

(87) PCT Pub. No.: WO2021/260091
PCT Pub. Date: Dec. 30, 2021

(65) Prior Publication Data
US 2023/0253894 A1 Aug. 10, 2023

(30) Foreign Application Priority Data

Jun. 24, 2020 (EP) ................................. 20181855

(51) Int. Cl.
*H02M 1/00* (2007.01)
*H02M 1/42* (2007.01)
(Continued)

(52) U.S. Cl.
CPC ......... *H02M 7/219* (2013.01); *H02M 1/0012* (2021.05); *H02M 1/4208* (2013.01); *H02M 7/062* (2013.01); *H02M 1/4275* (2021.05)

(58) Field of Classification Search
CPC .... H02M 1/42; H02M 1/4208; H02M 1/4216; H02M 1/4225; H02M 1/4233;
(Continued)

(56) References Cited

U.S. PATENT DOCUMENTS 8,971,057 B2 * 3/2015 Smith ..................... H02J 7/00
363/131
9,257,864 B2 * 2/2016 Pahlevaninezhad ...... H02J 7/02
(Continued)

FOREIGN PATENT DOCUMENTS

CN 110896282 A 3/2020
EP 2963761 A1 1/2016
(Continued)

OTHER PUBLICATIONS

European Office Action mailed Feb. 13, 2024 for European Application No. 21835292.1, a foreign counterpart to U.S. Appl. No. 18/012,597, 7 pages.
(Continued)

*Primary Examiner* — Sean Kayes
*Assistant Examiner* — Nusrat Quddus
(74) *Attorney, Agent, or Firm* — Lee & Hayes, P.C.

(57) ABSTRACT

The present disclosure relates to an AC-DC converter comprising: an AC side input port; a first DC connection and a second DC connection defining a DC side output port connectable to a load; an AC-DC rectifier having an AC rectifier side connected to the AC side input port and a DC rectifier side comprising a first DC rectifier connection and a second DC rectifier connection, wherein the first DC rectifier connection is connected to the first DC connection; a DC-AC converter having a first DC input and a second DC input, wherein the first DC input is connected to the second DC connection, and a first AC output and a second AC output, wherein the first AC output and the second AC output are connected to the AC side input port, or an AC-AC converter having a first AC input and a second AC input, wherein the first AC input is connected to the second DC connection, and a first AC output and a second AC output, wherein the first AC output and the second AC output are (Continued)

connected to the AC side input port. The disclosure further relates to a method of supplying power to a load by an AC-DC converter.

20 Claims, 14 Drawing Sheets

(51) Int. Cl.
*H02M 7/06* (2006.01)
*H02M 7/219* (2006.01)

(58) Field of Classification Search
CPC ............... H02M 1/4241; H02M 1/425; H02M 1/4258; H02M 1/4266; H02M 2001/4275; H02M 2001/4283; H02M 2001/4291; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 2001/123; H02H 7/261; H02H 7/268; H02J 3/36; H02J 3/01

See application file for complete search history.

(56) References Cited

U.S. PATENT DOCUMENTS

| | | | |
|---|---|---|---|
| 9,584,047 B2* | 2/2017 | Frohman | H02M 7/4807 |
| 12,145,460 B1* | 11/2024 | Khalid | B60L 53/22 |
| 2014/0103860 A1* | 4/2014 | Kominami | B60L 1/003 |
| | | | 320/108 |
| 2014/0146582 A1 | 5/2014 | Gupta | |
| 2014/0268959 A1* | 9/2014 | Frohman | H02M 7/4807 |
| | | | 363/98 |
| 2016/0294296 A1* | 10/2016 | Lee | H02M 1/44 |
| 2019/0229609 A1* | 7/2019 | Li | H02J 1/02 |
| 2021/0155100 A1* | 5/2021 | Khaligh | B60L 55/00 |
| 2021/0367453 A1* | 11/2021 | Galigekere | B60L 53/122 |
| 2022/0131383 A1* | 4/2022 | Milivojevic | H02J 1/106 |
| 2022/0376613 A1* | 11/2022 | Britton | H02M 1/44 |
| 2024/0348081 A1* | 10/2024 | Zhu | B60L 15/007 |

FOREIGN PATENT DOCUMENTS

| | | |
|---|---|---|
| JP | S5641770 B2 | 9/1981 |
| JP | H08256482 A | 10/1996 |
| JP | H10112938 A | 4/1998 |
| JP | 2002325461 A | 11/2002 |

OTHER PUBLICATIONS

Office Action for Japanese Application No. 2022-579915, Dated May 27, 2025, 12 pages.
Office Action for Korean Application No. 10-2023-7002355, Dated May 27, 2025, 10 pages.

* cited by examiner

AC-DC POWER SUPPLY

CROSS-REFERENCE TO RELATED APPLICATIONS

This application is the National Stage of International Application No. PCT/EP2021/067303, filed Jun. 24, 2021, which claims priority to EP Patent Application No. 20181855.6, filed Jun. 24, 2020. The entirety of each of the applications listed above is incorporated herein by reference.

The present disclosure relates to an AC-DC converter, in particular a unity power factor AC-DC converter for high power applications.

BACKGROUND

AC-DC converters are electrical circuits that transform alternating current (AC) input into direct current (DC) output. AC-DC converters are used in a range of applications and products, including motor drive, computers, chargers of electronic devices and other electronic apparatus etc.

In conventional AC-DC converters for high power applications, the AC-DC converter is connected in parallel or cascaded with the load, which means the AC-DC converter voltage rating and hence power rating must match the specifications of the load. For high voltage loads, such as batteries or electrolysis stacks, the AC-DC converter also has to be rated at high voltages. Hence, high voltage rated power components must be utilized, which are expensive and incur higher losses.

The most common solution to achieve high efficiency is to use high power rated power components, which results in major design challenges because the converter operates in a very harsh environment and experiences high thermal stress, which increases the risk of thermal breakdown and hence reduces its reliability.

Further challenges of the known implementations include a low power factor and harmonic distortion of the input current.

SUMMARY

A first embodiment of the presently disclosed AC-DC converter comprises:
- an AC side input port;
- a first DC connection and a second DC connection defining a DC side output port connectable to a load;
- an AC-DC rectifier having an AC rectifier side connected to the AC side input port and a DC rectifier side comprising a first DC rectifier connection and a second DC rectifier connection, wherein the first DC rectifier connection is connected to the first DC connection;
- a DC-AC converter having a first DC input and a second DC input, wherein the first DC input is connected to the second DC connection, and a first AC output and a second AC output, wherein the first AC output and the second AC output are connected to the AC side input port.

The AC-DC converter may have a first capacitor connected between the first DC rectifier connection and the second DC rectifier connection.

Alternatively, the AC-DC converter may, in a second embodiment, comprise:
- an AC side input port;
- a first DC connection and a second DC connection defining a DC side output port connectable to a load;
- an AC-DC rectifier having an AC rectifier side connected to the AC side input port and a DC rectifier side comprising a first DC rectifier connection and a second DC rectifier connection, wherein the first DC rectifier connection is connected to the first DC connection; and
- an AC-AC converter having a first AC input and a second AC input, wherein the first AC input is connected to the second DC connection, and a first AC output and a second AC output, wherein the first AC output and the second AC output are connected to the AC side input port.

The above AC-DC converters share the concept of having the load connected in series with the DC-AC converter or AC-AC converter. The output of the DC-AC or AC-AC converters is connected with the grid and can thereby feed real power and reactive power (achieve power factor correction) back to the utility. Since the DC-AC or AC-AC converter is arranged serially with the load, the voltage is shared between the load and the DC-AC or AC-AC converter. The DC-AC or AC-AC converter will thus only have a part of the total voltage. As explained, the output of the DC-AC or AC-AC converter is fed back to the AC input port of the AC-DC converter.

The presently disclosed AC-DC converter is particularly useful for a load in the form of at least one battery or electrolyze cell. In such a configuration the load can be said to use the power provided to the AC side input port, converted to DC and finally provided to the load.

Due to the rectifier, which may be a diode rectifier, the input current of the AC-DC converter may be distorted. This may have the consequence that it cannot fulfil current harmonic requirements for high power applications. High power application within the context of the present disclosure may be defined as application above 40 W. A low-frequency transformer (e.g. 50 or 60 Hz) may therefore be connected between the DC-AC converter or AC-AC converter and the AC side input port, which may provide compensation for the harmonics to make the grid current $i_{grid}$ sinusoidal, as well as in phase with the input AC voltage, thus having a unity power factor. The presently disclosed AC-DC converter may thus be a unity power factor AC-DC converter for high power applications.

One difference between the first and second embodiments, which, however, share the general concept of the serial arrangement of the load and the DC-AC or AC-AC converter and the connection back to the AC input port, is the absence of the first capacitor in the second embodiment. In a power electronic system, electrolytic capacitors may limit the lifetime of the entire system. Removing such capacitors may therefore reduce system cost and at the same time increase lifetime. However, in the absence of the capacitor, the DC voltage after the AC-DC rectifier is a rectified sinusoidal waveform. As a consequence, the input voltage of the DC-AC converter or AC-AC converter must be negative when the DC voltage after the AC-DC rectifier is lower than the voltage across the load. For this reason, an AC-AC converter is used (second embodiment).

In one embodiment the AC-DC rectifier is a diode rectifier. The diode rectifier does not have to be actively controlled. The AC-DC rectifier can be configured to provide a rectifier output voltage between the first DC rectifier connection and the second DC rectifier connection without any active control of the AC-DC rectifier. A control unit may instead be configured to control a current through the load, preferably wherein the DC-DC converter portion is configured to control the current through the load. Moreover, the AC-DC converter may be configured to control an input current to the AC-DC rectifier, preferably wherein the DC-AC inverter portion is configured to control the input current. The control unit may be configured to control the DC-AC or AC-AC converter as an active rectifier. The control unit may be configured to control a load voltage delivered from the AC-DC rectifier to be as close as possible to a predetermined load voltage. These and other aspects of how the control of the presently disclosed AC-DC converter operates are further described below.

The AC-DC rectifier may be configured to carry one part of a load power to the load whereas the DC-AC converter/AC-AC converter is configured to carry another part of the load power to the load. The DC-AC converter/AC-AC converter may be a bidirectional DC-AC or AC-AC converter.

The present disclosure further relates to a method of supplying power to a load by an AC-DC converter, the method comprising the steps of:
 providing an AC-DC converter having an AC side input port; a DC side output port; an AC-DC rectifier; and a DC-AC converter or an AC-AC converter,
 connecting the AC side input port to a grid;
 connecting the AC-DC rectifier to the load;
 connecting the DC-AC converter or AC-AC converter serially with the load;
 connecting an output of the DC-AC converter or AC-AC converter to the grid.

As would be recognized by a person skilled in the art, the presently disclosed method may be performed using any embodiment of the presently disclosed AC-DC converter. This includes that the method may comprise any step corresponding to steps described in terms of what the AC-DC converter, more specifically the control unit of the AC-DC converter, is configured to do.

DETAILED DESCRIPTION

The present disclosure relates to an AC-DC converter comprising:
 an AC side input port;
 a DC side output port;
 an AC-DC rectifier; and a
 a DC-AC converter or an AC-AC converter,
 wherein the DC-AC converter or an AC-AC converter is connected serially to a load of the AC-DC converter and wherein the output of the DC-AC converter or an AC-AC converter fed back to the AC side input port.

More specifically, the AC-DC converter may be one of two alternatives:

The first embodiment is an AC-DC converter comprising:
 an AC side input port;
 a first DC connection and a second DC connection defining a DC side output port connectable to a load;
 an AC-DC rectifier having an AC rectifier side connected to the AC side input port and a DC rectifier side comprising a first DC rectifier connection and a second DC rectifier connection, wherein the first DC rectifier connection is connected to the first DC connection;
 a DC-AC converter having a first DC input and a second DC input, wherein the first DC input is connected to the second DC connection, and a first AC output and a second AC output, wherein the first AC output and the second AC output are connected to the AC side input port.

The AC-DC converter may have a first capacitor connected between the first DC rectifier connection and the second DC rectifier connection.

Figure 1A:
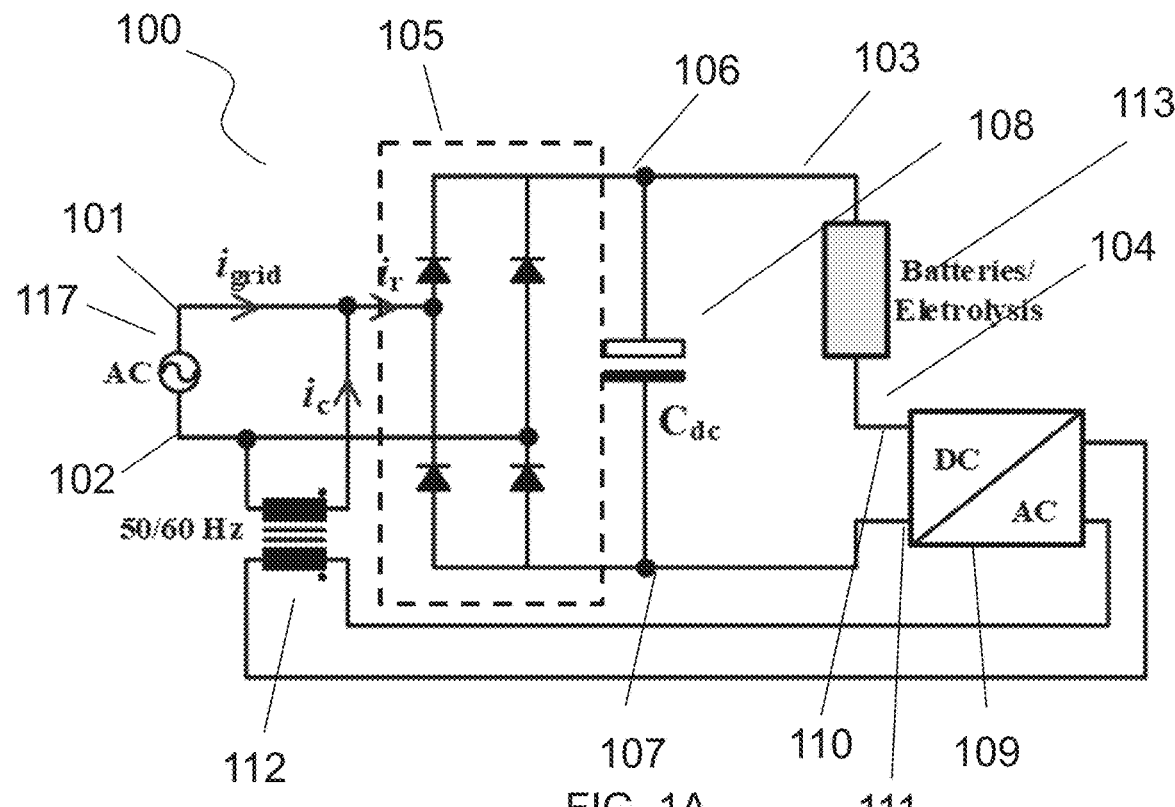
FIG. 1 shows two single-phase embodiments of the presently disclosed AC-DC converter using DC-AC based feedback.
Figure 1B:
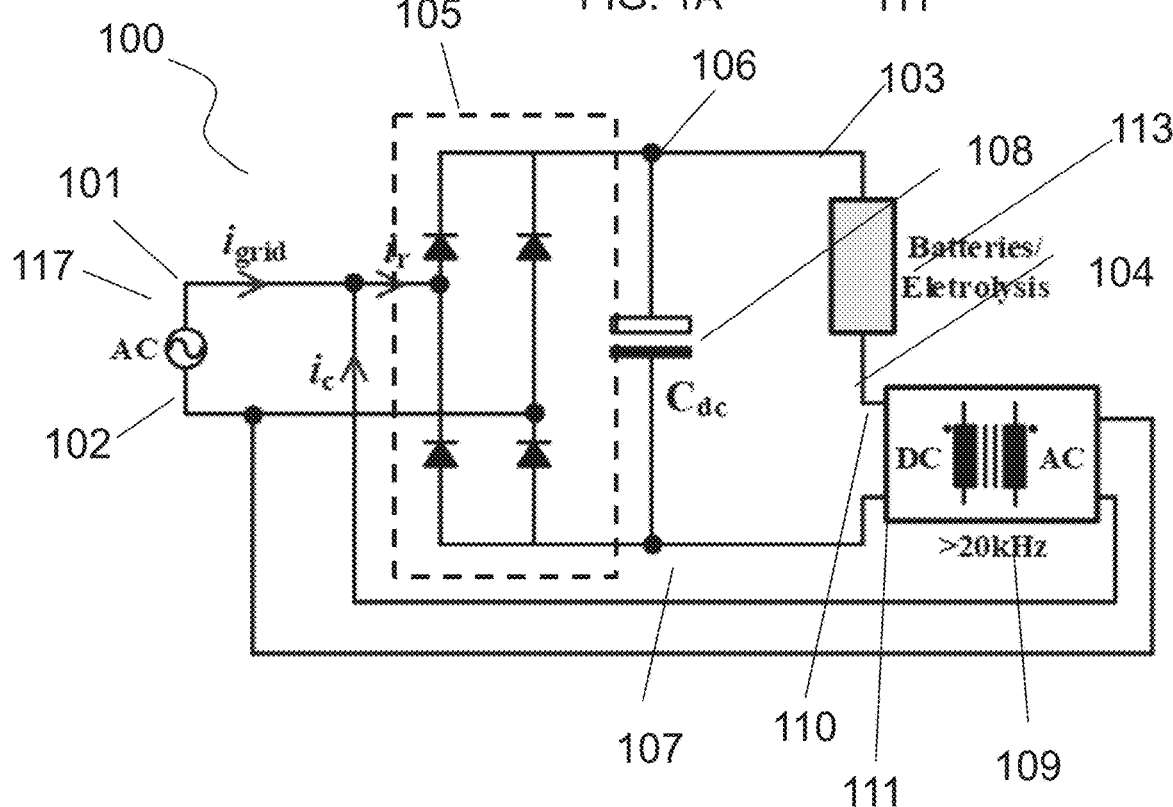

Such embodiments are illustrated in FIGS. 1A and 1B.

A second embodiment is an AC-DC converter comprising:
 an AC side input port;
 a first DC connection and a second DC connection defining a DC side output port connectable to a load;
 an AC-DC rectifier having an AC rectifier side connected to the AC side input port and a DC rectifier side comprising a first DC rectifier connection and a second DC rectifier connection, wherein the first DC rectifier connection is connected to the first DC connection;
 an AC-AC converter having a first AC input and a second AC input, wherein the first AC input is connected to the second DC connection, and a first AC output and a second AC output, wherein the first AC output and the second AC output are connected to the AC side input port.

Figure 2A:
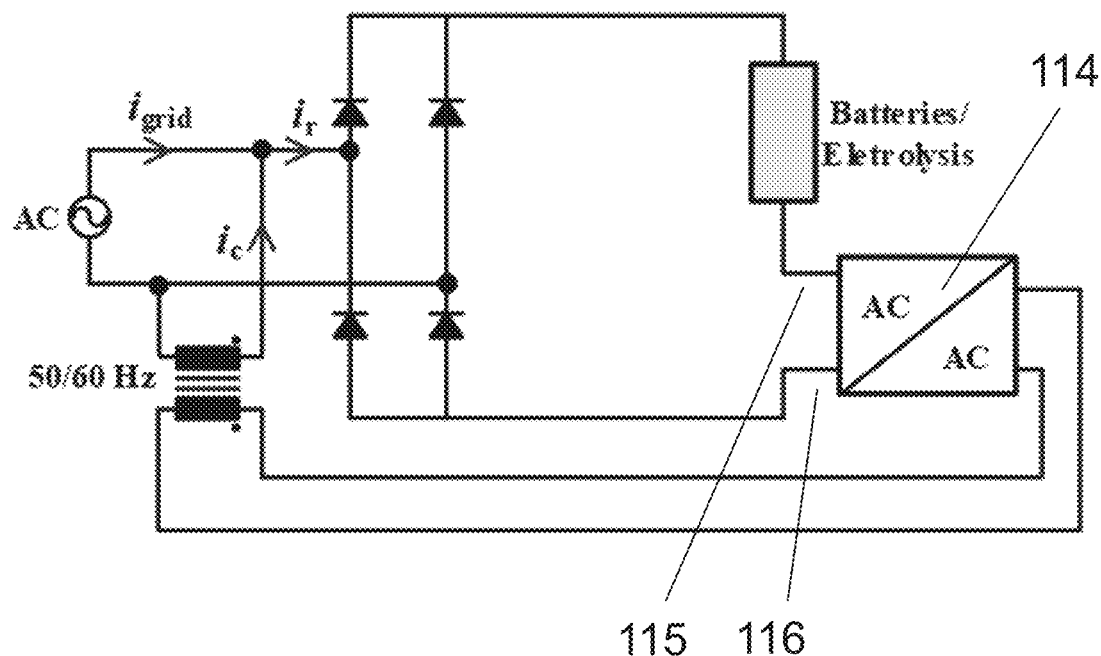
FIG. 2 shows two further single-phase embodiments of the presently disclosed AC-DC converter using AC-AC based feedback.
Figure 2B:
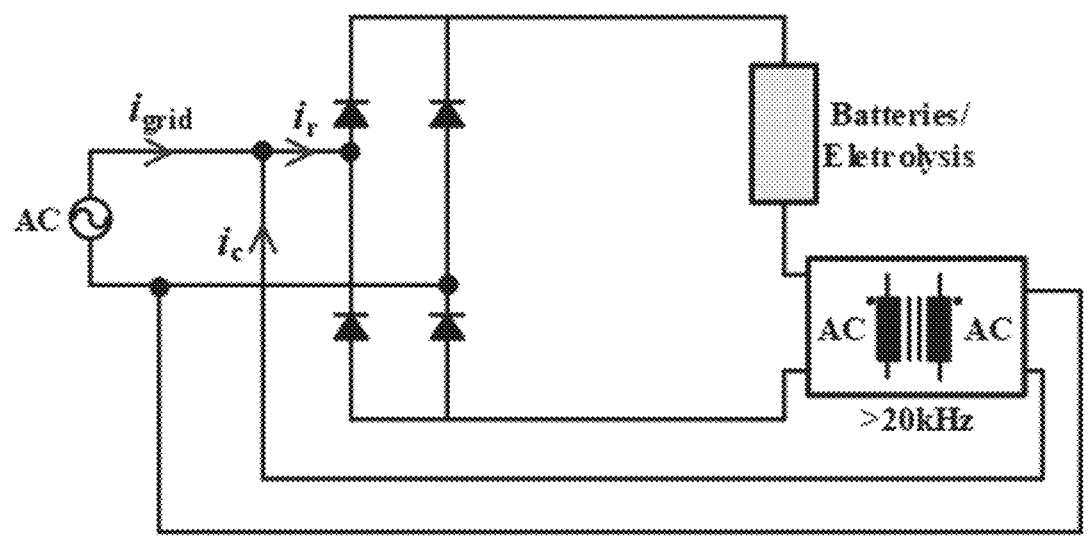

Such embodiments are illustrated in FIGS. 2A and 2B.

The AC-DC converter may be a switched mode pulse width modulated AC-DC converter.

In a single-phase configuration, the load may have a large voltage. The serial arrangement of the load and the DC-AC or AC-AC converter will divide the voltage over the load and the DC-AC or AC-AC converter. This solution can significantly reduce the converter power rating of the DC-AC or AC-AC converter. The power operated by the DC-AC converter or AC-AC converter may be sent back to the AC side input port.

Due to the diode rectifier, the input current $i_{grid}$ may be distorted. Hence, under conventional operation it may not be able to fulfill the current harmonic requirements in high-power applications. High power application within the context of the present disclosure may be defined as application above 40 W. The presently disclosed AC-DC converter may be configured to operate in power applications, wherein a power operated by the load is greater than 50 W, preferably greater than 1 kW, more preferably greater than 10 kW. A low-frequency transformer may be used to separate the grounds of the AC side and the DC side. If the DC-AC or AC-AC converter is controlled as an active rectifier, harmonics can be compensated for to make the grid current $i_{grid}$ sinusoidal and in phase with the input AC voltage. The low-frequency transformer may be a 50 Hz or 60 Hz transformer.

Figure 3:
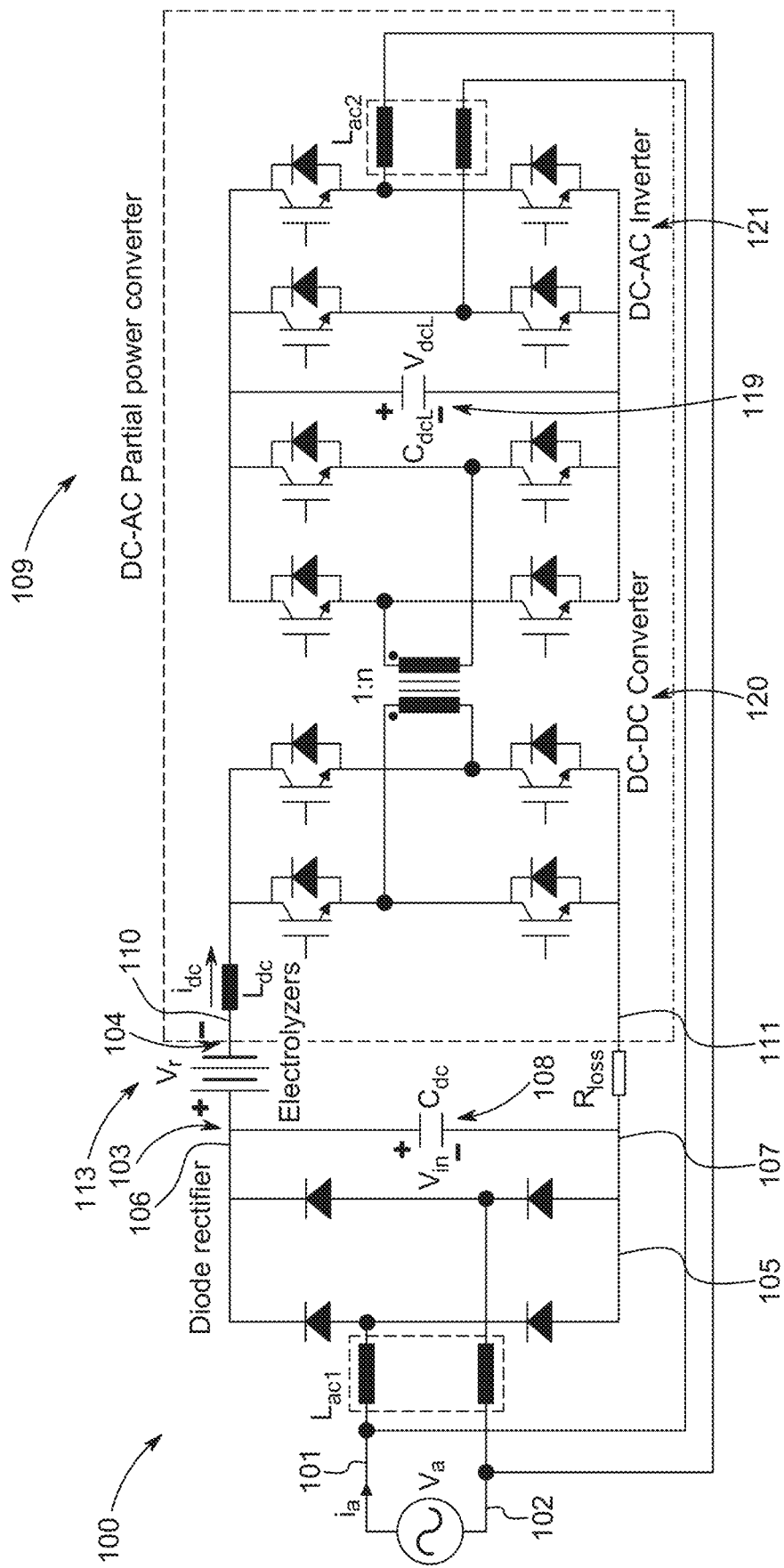
FIG. 3 shows a further single-phase embodiment of the presently disclosed AC-DC converter using DC-AC based feedback.

Alternatively, a high-frequency link inverter can be used. In the embodiment having a DC-AC converter, the DC-AC converter may be a high-frequency link DC-AC inverter. In the embodiment having an AC-AC converter, the AC-AC converter may be a high-frequency link AC-AC inverter. As would be recognized by a person skilled in the art high-frequency switched power electronic transformers are light and efficient. The high-frequency link DC-AC inverter or the high-frequency link AC-AC inverter is configured to operate at a frequency greater than 10 kHz, preferably at a frequency greater than 20 kHz. The DC-AC converter may comprise a DC-DC converter portion and a DC-AC inverter portion. The DC-AC converter may comprise a second capacitor arranged between the DC-DC converter portion and the DC-AC inverter portion, preferably connected parallel to the DC-DC converter portion and a DC-AC inverter portion, as shown in FIG. 3.

The AC-DC converter is suitable for an implementation as a single-phase AC-DC converter or a three-phase AC-DC converter. Example of three-phase AC-DC converters according to the presently disclosed AC-DC converter are shown in FIGS. 5-6.

As explained above, one difference between the first and second embodiments is the absence of the, typically large, capacitor in the second embodiment and the use of an AC-AC converter instead of a DC-AC converter. The same logic can be applied to the three-phase AC-DC converter. As shown in FIGS. 5-6, the concept can be applied to a three-phase AC-DC converter. In FIG. 5, due to the three-phase configuration, the first DC rectifier connection and second DC rectifier connection on the DC rectifier side have less voltage ripple. If no electrolytic capacitors are used, a DC-AC converter can control the load current so that the voltage ripple only appears over the DC-AC's input. A non-isolated DC-AC converter with a low-frequency transformer, or a three-phase high-frequency-link inverter, respectively, can be adopted for real and reactive power regulation. The AC-DC converter may accordingly be configured to feed real and reactive power back to a grid connected to the AC side input port. The DC-AC converter with a low-frequency transformer, or a three-phase high-frequency-link inverter may be controlled such that the grid currents are sinusoidal with a unity power factor. In case the load voltage can be lower or higher than the voltage between the first DC rectifier connection and second DC rectifier connection, the voltage $v_c$ on the input of the DC-AC converter will be positive or negative. Thus, an AC-AC converter may be used in this case, as shown in FIGS. 6A-B.

Since the serial arrangement of the load and the DC-AC or AC-AC converter may divide the voltage over the load and the DC-AC or AC-AC converter, a lower power rated DC-AC or AC-AC converter can be used. According to a non-limiting example, the three-phase AC-DC converter may be arranged to have a voltage $v_{rec}$=565V on the rectifier output, i.e. from the first DC rectifier connection and second DC rectifier connection. Due to the serial arrangement of the load and the DC-AC or AC-AC converter, the load can then, accordingly, have e.g. 500 V and the DC-AC converter, accordingly, 65 V. If the power operated by the load is 50 kW, the current through the load is 50 kW/500V=100 A. The current through the DC-AC converter is the same, hence the power of the DC-AC converter is 65V*100 A=6.5 kW.

In one embodiment of the presently disclosed AC-DC converter, the converter is configured to operate with a voltage greater than 200 V on the AC-DC rectifier, preferably with a voltage greater than 400 V on the AC-DC rectifier, more preferably with a voltage greater than 500 V on the AC-DC rectifier.

Furthermore, the presently disclosed AC-DC converter may be configured to operate with a voltage greater than 200 V on the load, preferably with a voltage greater than 400 V on the load, more preferably with a voltage greater than 500 V on the load.

The AC-DC converter may further comprise a control unit configured to control an operation of the AC-DC converter. In one embodiment, the AC-DC converter is configured to control a current through the load, preferably wherein the DC-DC converter portion is configured to control the current through the load. In one embodiment, the AC-DC converter is configured to control an input current to the AC-DC rectifier, preferably wherein the DC-AC inverter portion is configured to control the input current. The DC-AC inverter portion may control real and reactive power injected back to the grid i.e. feed real power back and at the same time achieve power factor correction. In one embodiment, the AC-DC converter is configured to control a DC voltage on the second capacitor, preferably wherein the DC-AC inverter portion is configured to control the DC voltage on the second capacitor.

The present disclosure further relates to a method of supplying power to a load by an AC-DC converter, the method comprising the steps of:
  providing an AC-DC converter having an AC side input port; a DC side output port; an AC-DC rectifier; and a DC-AC converter or an AC-AC converter,
  connecting the AC side input port to a grid;
  connecting the AC-DC rectifier to the load;
  connecting the DC-AC converter or AC-AC converter serially with the load;
  connecting an output of the DC-AC converter or AC-AC converter to the grid.

According to one embodiment, the method comprises the step of feeding real and reactive power back to the grid from the DC-AC converter or AC-AC converter.

The method may comprise the step of regulating real power and reactive power (achieve power factor correction) at the AC side input port. In this manner, a unity power factor AC-DC operation can be achieved. The step of regulating real and reactive power at the AC side input port can be performed by controlling an operation of the DC-AC converter or AC-AC converter. The method may comprise the step of controlling the DC-AC converter or AC-AC converter such that a voltage and a current at the AC side input port are in phase.

DETAILED DESCRIPTION OF DRAWINGS

The invention will in the following be described in greater detail with reference to the accompanying drawings. The drawings are exemplary and are intended to illustrate some of the features of the presently disclosed AC-DC converter, and are not to be construed as limiting to the presently disclosed invention.

FIG. 1A shows a single-phase embodiment of the presently disclosed AC-DC converter (100). The AC-DC converter (100) comprises an AC side input port (117) having a first AC connection (101) and a second AC connection (102). The AC-DC converter (100) further comprises a DC side output port having a first DC connection (103) and a second DC connection (104), to which a load (113) is connected. The AC-DC converter (100) further comprises an AC-DC rectifier (105) and a capacitor (108) connected between a first DC rectifier connection (106) and the second DC rectifier connection (107). The capacitor (108) is connected parallel to the AC-DC rectifier (105). The AC-DC converter (100) further comprises a DC-AC converter (109) coupled back to the AC side input port via a low frequency transformer (112). The DC-AC converter (109) has first DC input (110) and a second DC input (111). By having the load and the DC-AC or AC-AC converter arranged serially, a lower power rated DC-AC or AC-AC converter can be used.

FIG. 1B shows an alternative single-phase embodiment of the presently disclosed AC-DC converter (100). The AC-DC converter (100) comprises an AC side input port having a first AC connection (101) and a second AC connection (102). The AC-DC converter (100) further comprises a DC side output port having a first DC connection (103) and a second DC connection (104), to which a load (113) is connected. The AC-DC converter (100) further comprises an AC-DC rectifier (105) and a capacitor (108) connected between a first DC rectifier connection (106) and the second DC rectifier connection (107). The capacitor (108) is connected parallel to the AC-DC rectifier (105). The AC-DC converter (100) further comprises a high-frequency link DC-AC inverter (109) connected to the AC side input port. The DC-AC converter (109) has first DC input (110) and a second DC input (111).

FIG. 2A shows a single-phase embodiment of the presently disclosed AC-DC converter (100). The AC-DC converter (100) comprises an AC side input port having a first AC connection (101) and a second AC connection (102). The AC-DC converter (100) further comprises a DC side output port having a first DC connection (103) and a second DC connection (104), to which a load (113) is connected. The AC-DC converter (100) further comprises an AC-DC rectifier (105) connected between a first DC rectifier connection (106) and the second DC rectifier connection (107). The AC-DC converter (100) further comprises an AC-AC converter (114) coupled back to the AC side input port via a low frequency transformer (112). The AC-AC converter (114) has a first AC input (115) and a second AC input (116).

FIG. 2B shows an alternative single-phase embodiment of the presently disclosed AC-DC converter (100). The AC-DC converter (100) comprises an AC side input port having a first AC connection (101) and a second AC connection (102). The AC-DC converter (100) further comprises a DC side output port having a first DC connection (103) and a second DC connection (104), to which a load (113) is connected. The AC-DC converter (100) further comprises an AC-DC rectifier (105) connected between a first DC rectifier connection (106) and the second DC rectifier connection (107). The AC-DC converter (100) further comprises an AC-AC converter (114) coupled back to the AC side input port. The AC-AC converter (114) has a first AC input (115) and a second AC input (116).

FIG. 3 shows a further example of a single-phase embodiment of the presently disclosed AC-DC converter (100). The AC-DC converter (100) comprises an AC side input port having a first AC connection (101) and a second AC connection (102). The AC-DC converter (100) further comprises a DC side output port having a first DC connection (103) and a second DC connection (104), to which electrolyzers (113) are connected. The AC-DC converter further comprises a DC-AC power converter (109), implemented as a DC-DC converter and a DC-AC inverter. The AC-DC converter (100) further comprises an AC-DC rectifier (105) and a first capacitor (108) connected between a first DC rectifier connection (106) and a second DC rectifier connection (107). The first capacitor (108) is connected parallel to the AC-DC rectifier (105). The AC-DC converter (100) further comprises a second capacitor (119) arranged between a DC-DC converter portion (120) and a DC-AC inverter portion (121). The AC-DC converter (100) further comprises a high-frequency link DC-AC inverter (109) connected to the AC side input port.

Figure 4A:
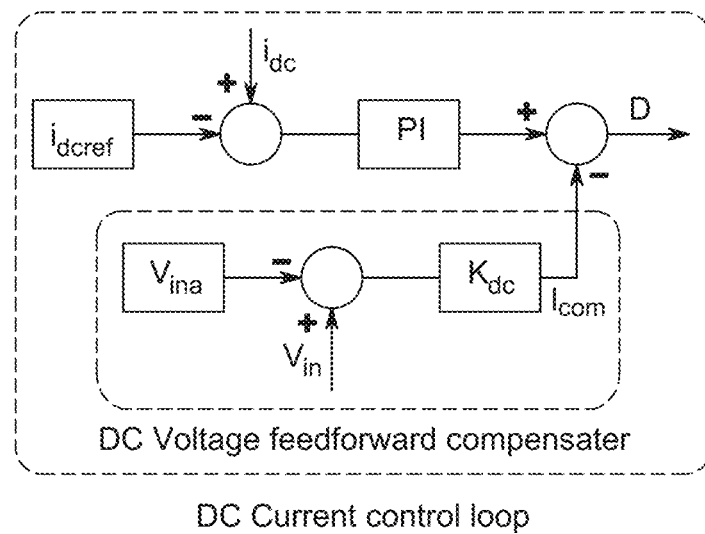
FIG. 4 show examples of a DC current control loop and an AC current control loop for the AC-DC converter.
Figure 4B:
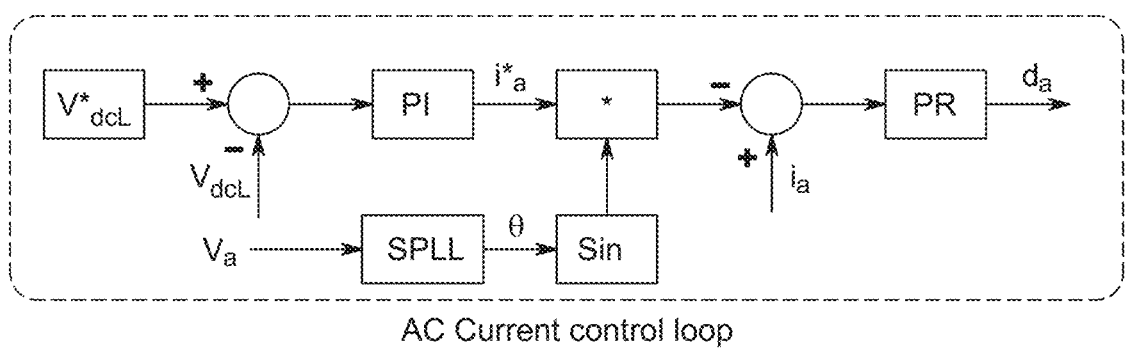

FIG. 4 show examples of a DC current control loop and an AC current control loop for the AC-DC converter. The AC current control loop controls an input current $I_a$ to the AC-DC rectifier. The DC current control loop controls a current $I_{dc}$ through the load.

Figure 5A:
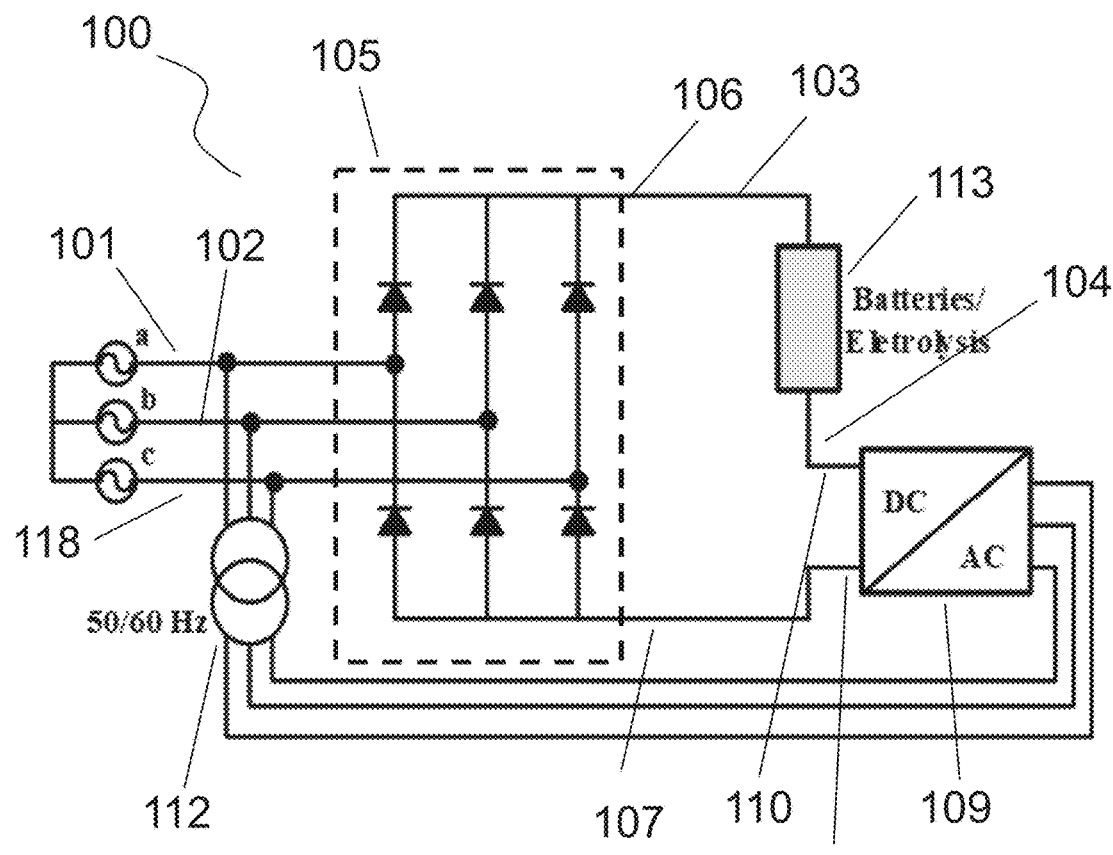
FIG. 5 shows two three-phase embodiments of the presently disclosed AC-DC converter using DC-AC based feedback.
Figure 6A:
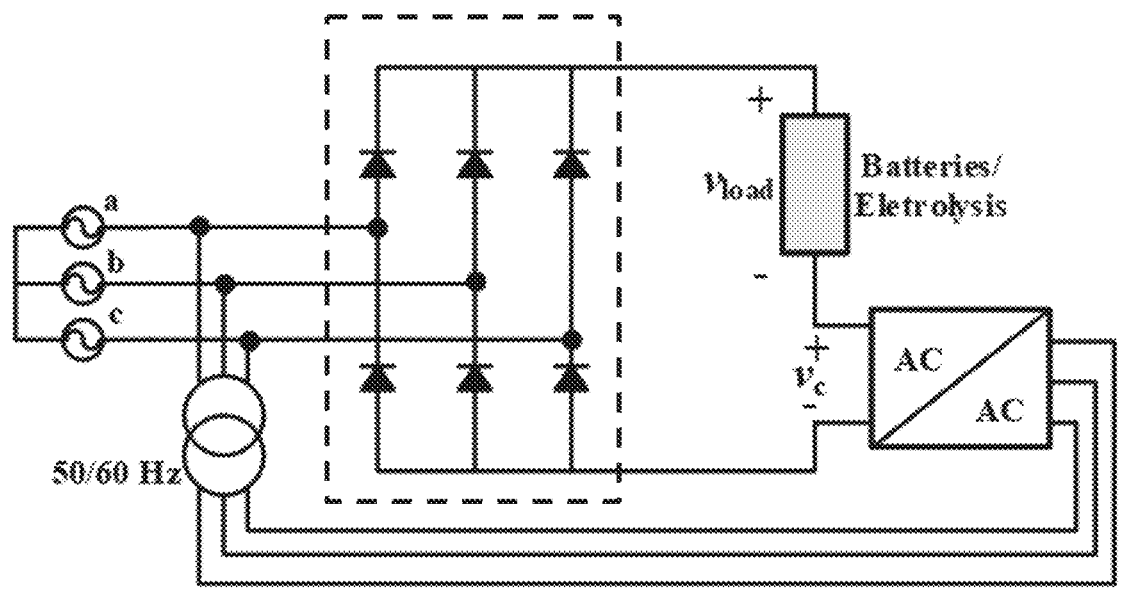
FIG. 6 shows two further three-phase embodiments of the presently disclosed AC-DC converter using AC-AC based feedback.
Figure 6B:
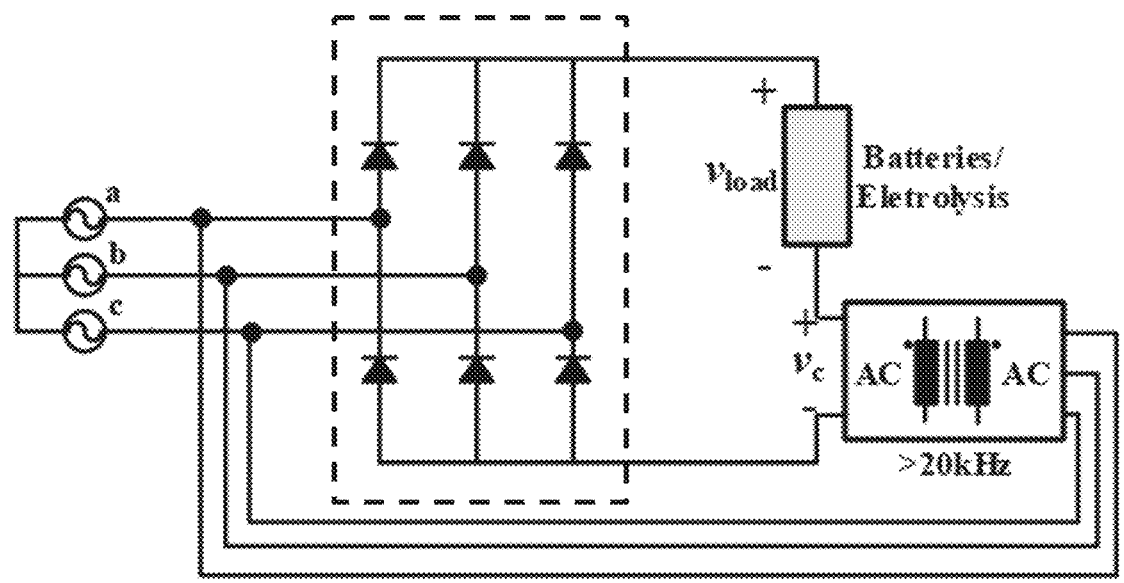

FIG. 5A shows a three-phase embodiment of the presently disclosed AC-DC converter (100). The AC-DC converter (100) comprises an AC side input port having a first AC connection (101), a second AC connection (102) and a third AC connection (118). The AC-DC converter (100) further comprises a DC side output port having a first DC connection (103) and a second DC connection (104), to which a load (113) is connected. The AC-DC converter (100) further comprises an AC-DC rectifier (105). The AC-DC converter (100) further comprises a DC-AC converter (109) coupled back to the AC side input port via a low frequency transformer (112). The DC-AC converter (109) has first DC input (110) and a second DC input (111).

Figure 5B:
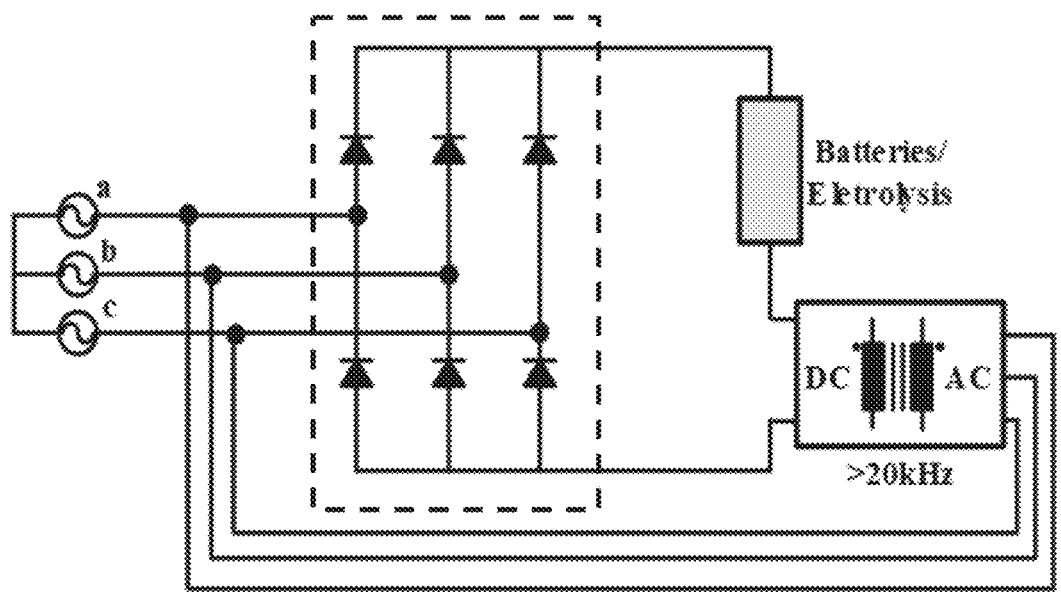

FIG. 5B shows an alternative three-phase embodiment of the presently disclosed AC-DC converter (100). The AC-DC converter (100) comprises an AC side input port having a first AC connection (101), a second AC connection (102) and a third AC connection (118). The AC-DC converter (100) further comprises a DC side output port having a first DC connection (103) and a second DC connection (104), to which a load (113) is connected. The AC-DC converter (100) further comprises an AC-DC rectifier (105) connected between a first DC rectifier connection (106) and the second DC rectifier connection (107). The AC-DC converter (100) further comprises a high-frequency link DC-AC inverter (109) connected to the AC side input port. The DC-AC converter (109) has first DC input (110) and a second DC input (111).

FIG. 6A shows a three-phase embodiment of the presently disclosed AC-DC converter (100). The AC-DC converter (100) comprises an AC side input port having a first AC connection (101), a second AC connection (102) and a third AC connection (118). The AC-DC converter (100) further comprises a DC side output port having a first DC connection (103) and a second DC connection (104), to which a load (113) is connected. The AC-DC converter (100) further comprises an AC-DC rectifier (105) connected between a first DC rectifier connection (106) and the second DC rectifier connection (107). The AC-DC converter (100) further comprises an AC-AC converter (114) coupled back to the AC side input port. The AC-AC converter (114) has a first AC input (115) and a second AC input (116).

FIG. 6B shows an alternative three-phase embodiment of the presently disclosed AC-DC converter (100). The AC-DC converter (100) comprises an AC side input port having a first AC connection (101) and a second AC connection (102). The AC-DC converter (100) further comprises a DC side output port having a first DC connection (103) and a second DC connection (104), to which a load (113) is connected. The AC-DC converter (100) further comprises an AC-DC rectifier (105) connected between a first DC rectifier connection (106) and the second DC rectifier connection (107). The AC-DC converter (100) further comprises an AC-AC converter (114) coupled back to the AC side input port. The AC-AC converter (114) has a first AC input (115) and a second AC input (116).

Figure 7:
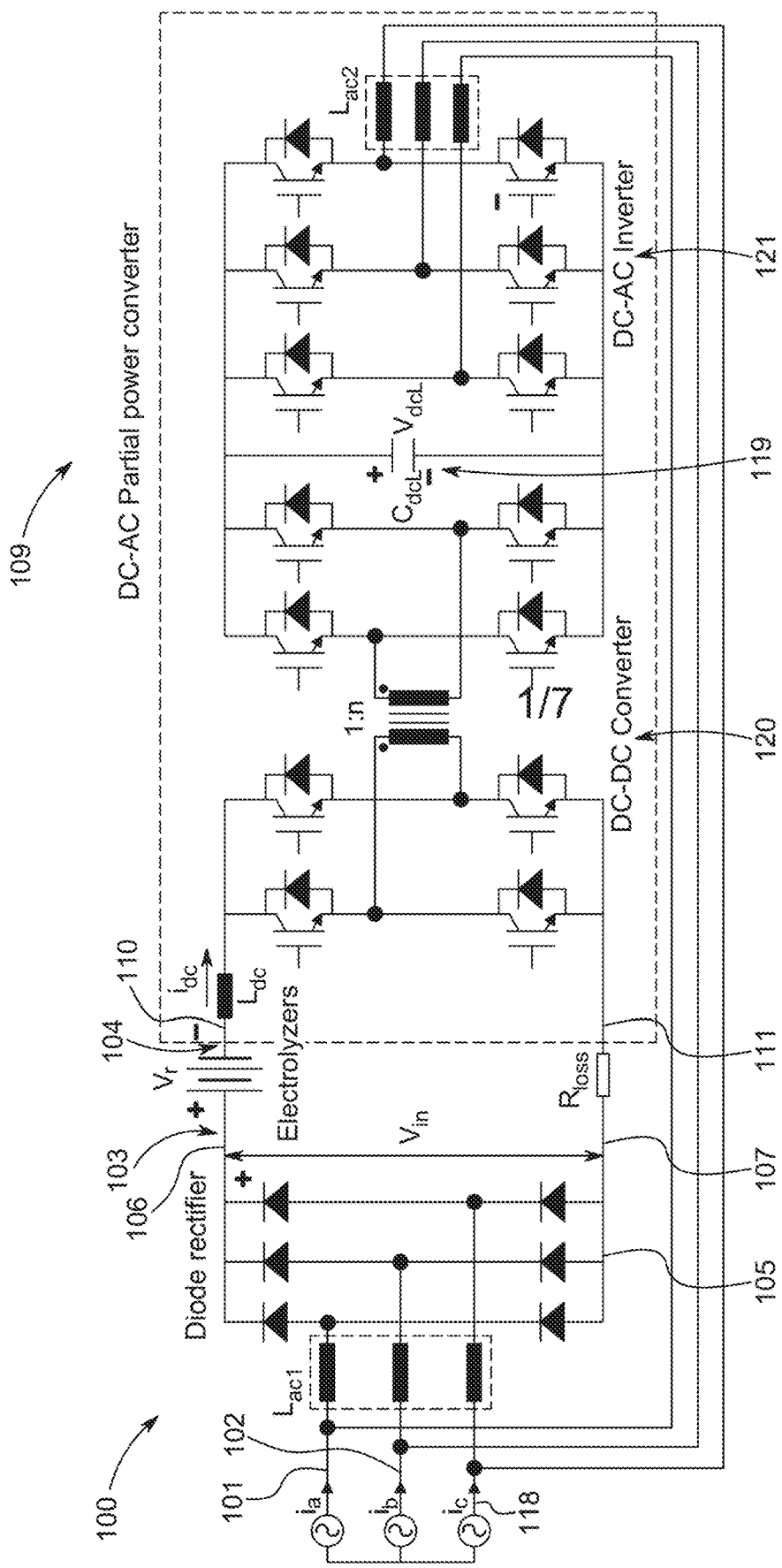
FIG. 7 shows a three-phase embodiment of the presently disclosed AC-DC converter using DC-AC based feedback.

FIG. 7 shows a three-phase embodiment of the presently disclosed AC-DC converter (100) using DC-AC based feedback. The AC-DC converter (100) comprises an AC side input port having a first AC connection (101), a second AC connection (102) and a third AC connection (118). The AC-DC converter (100) further comprises a DC side output port having a first DC connection (103) and a second DC connection (104), to which a load (113) is connected. The AC-DC converter (100) further comprises an AC-DC rectifier (105). The AC-DC converter (100) further comprises a DC-AC inverter (109) having a DC-DC converter portion (120) and a DC-AC inverter portion (121) connected to the AC side input port. The AC-DC converter (100) further comprises a second capacitor (119) arranged between the DC-DC converter portion (120) and the DC-AC inverter portion (121).

Figure 8:
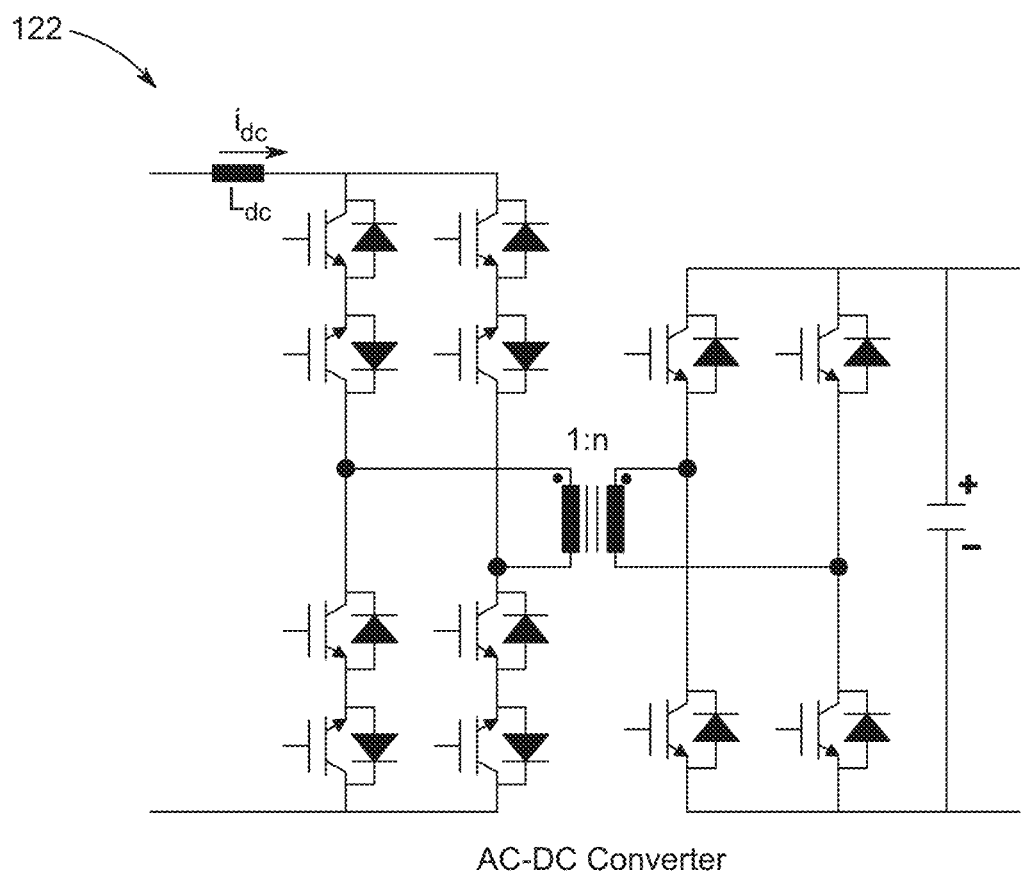
FIG. 8 shows an example of an embodiment of an AC-DC converter portion that can be used in the presently disclosed AC-DC converter using AC-AC based feedback.

FIG. 8 shows an example of an embodiment of an AC-DC converter portion (122) that can be used in the presently disclosed AC-DC converter using AC-AC based feedback. This AC-DC converter portion (122) may replace the DC-DC converter portion (121) in FIGS. 3 and 7 to form the high-frequency link AC-AC inverter for the single-phase and three-phase embodiments of the presently disclosed AC-DC converter (100), respectively.

Figure 9:
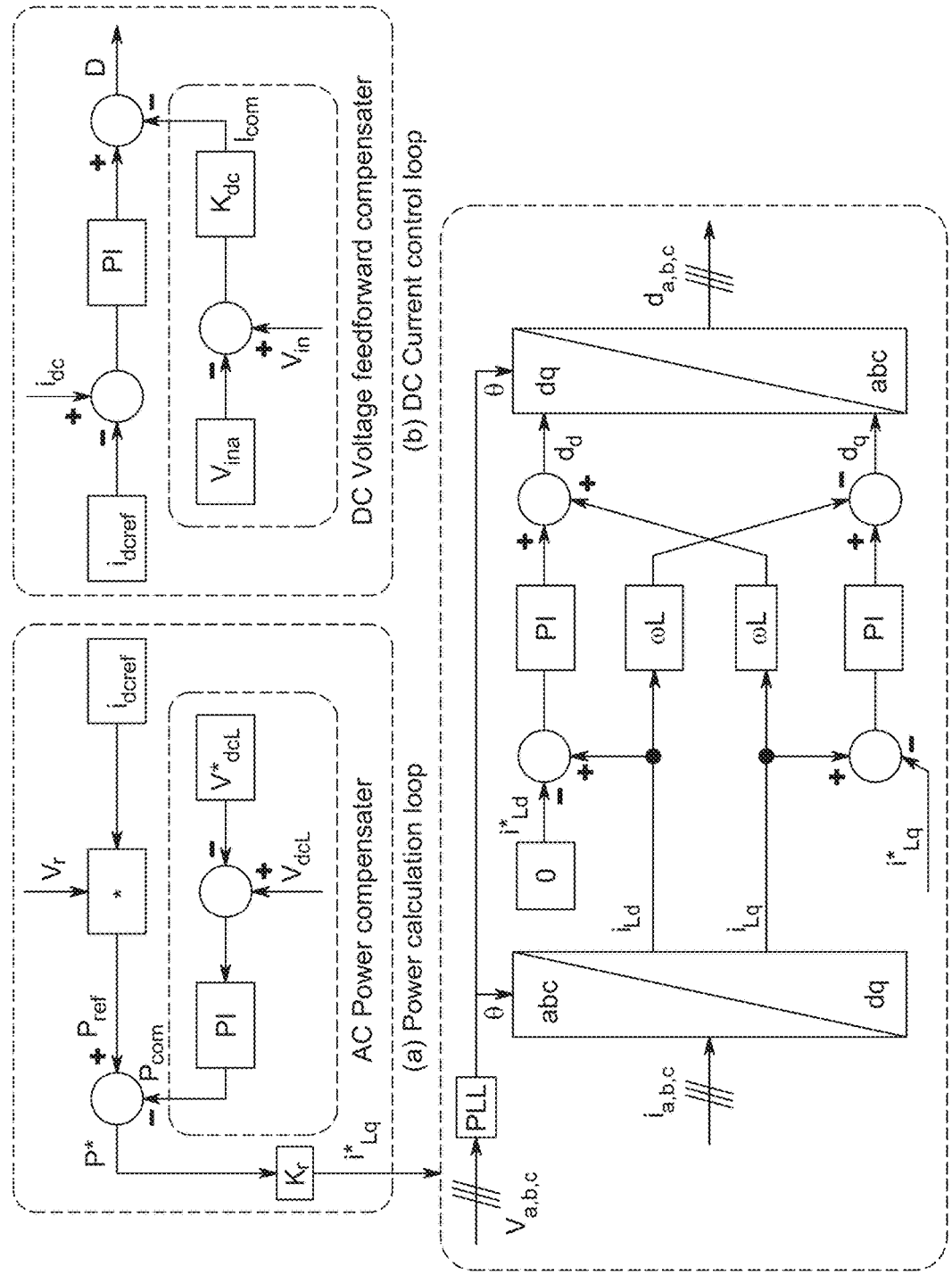
FIG. 9 show examples of a power calculation loop, a DC current control loop and an AC current control loop for the AC-DC converter.

FIG. 9 show examples of a power calculation loop, a DC current control loop and an AC current control loop for the AC-DC converter. The AC current control loop controls input current $I_{a,b,c}$ to the AC-DC rectifier. The DC current control loop controls a current $I_{dc}$ through the load.

Figure 10:
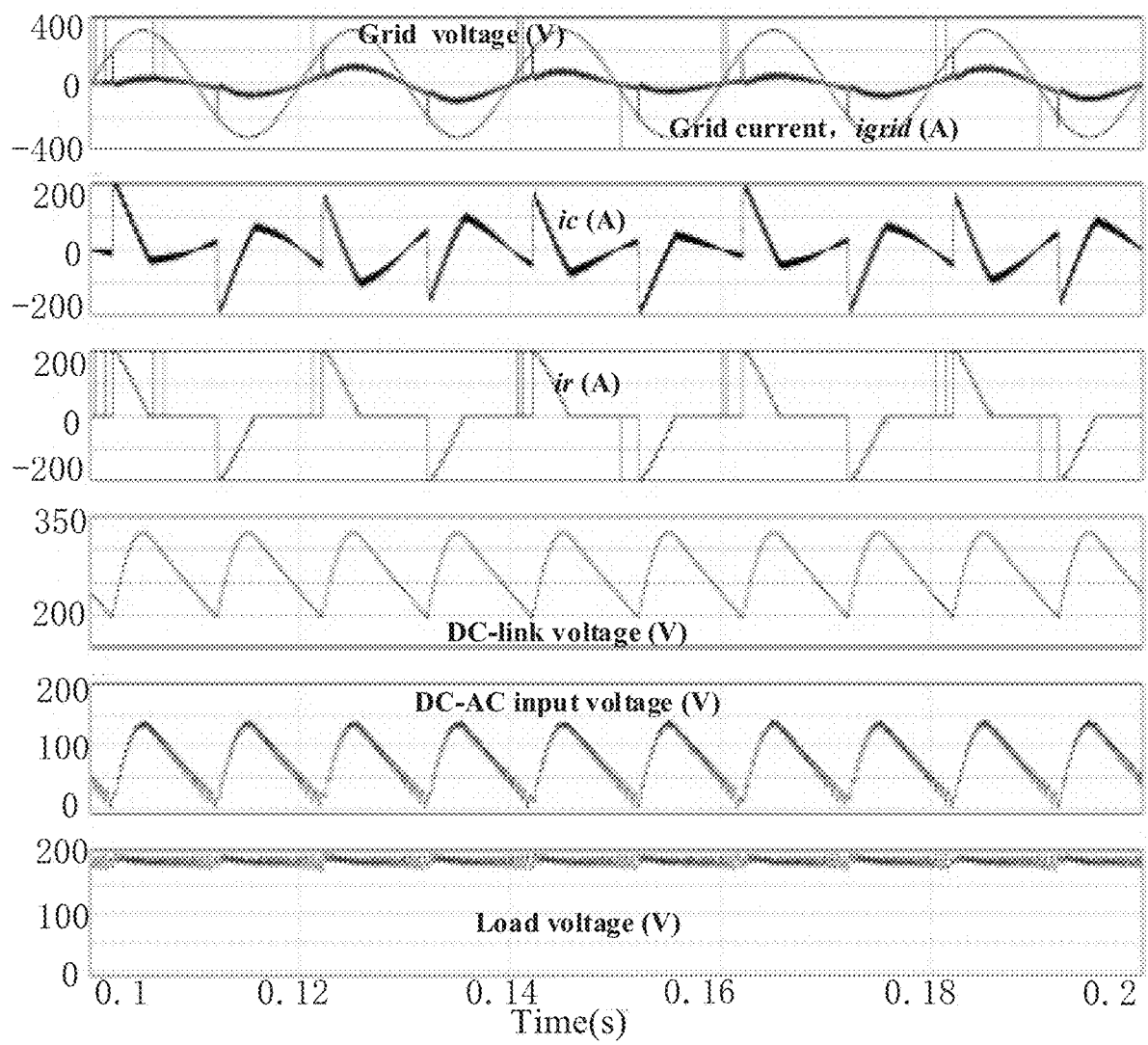
FIG. 10-13 show simulation results for embodiments of the presently disclosed AC-DC converter.

FIG. 10 shows simulation results for an embodiment of the presently disclosed AC-DC converter according to FIG. 1B. The simulations show, from top to bottom, the grid voltage and current, the current $i_c$ current fed back from the high-frequency link DC-AC inverter, the current $i_r$ going to the AC-DC rectifier, the voltage over a DC-DC converter portion, the input voltage to the DC-AC converter, and the voltage over the load. According to a non-limiting example, the following parameters can be configured:

| Parameter | Value |
| --- | --- |
| AC input voltage | 230 V |
| DC-link capacitor (108) | 2000 µF |
| DC-link voltage, $V_{DC}$ | 270 V |
| Load current, $I_{load}$ (DC) | 40 A |
| Load voltage, $V_{load}$ (DC) | 190 V |
| Load power, $P_{load}$ | 7600 W |
| Input voltage to high-frequency link DC-AC inverter (average) | 80 V |
| High-frequency link DC-AC inverter power, $P_{dcac}$ | 3200 W |
| Switching frequency | 50 kHz |

Figure 11:
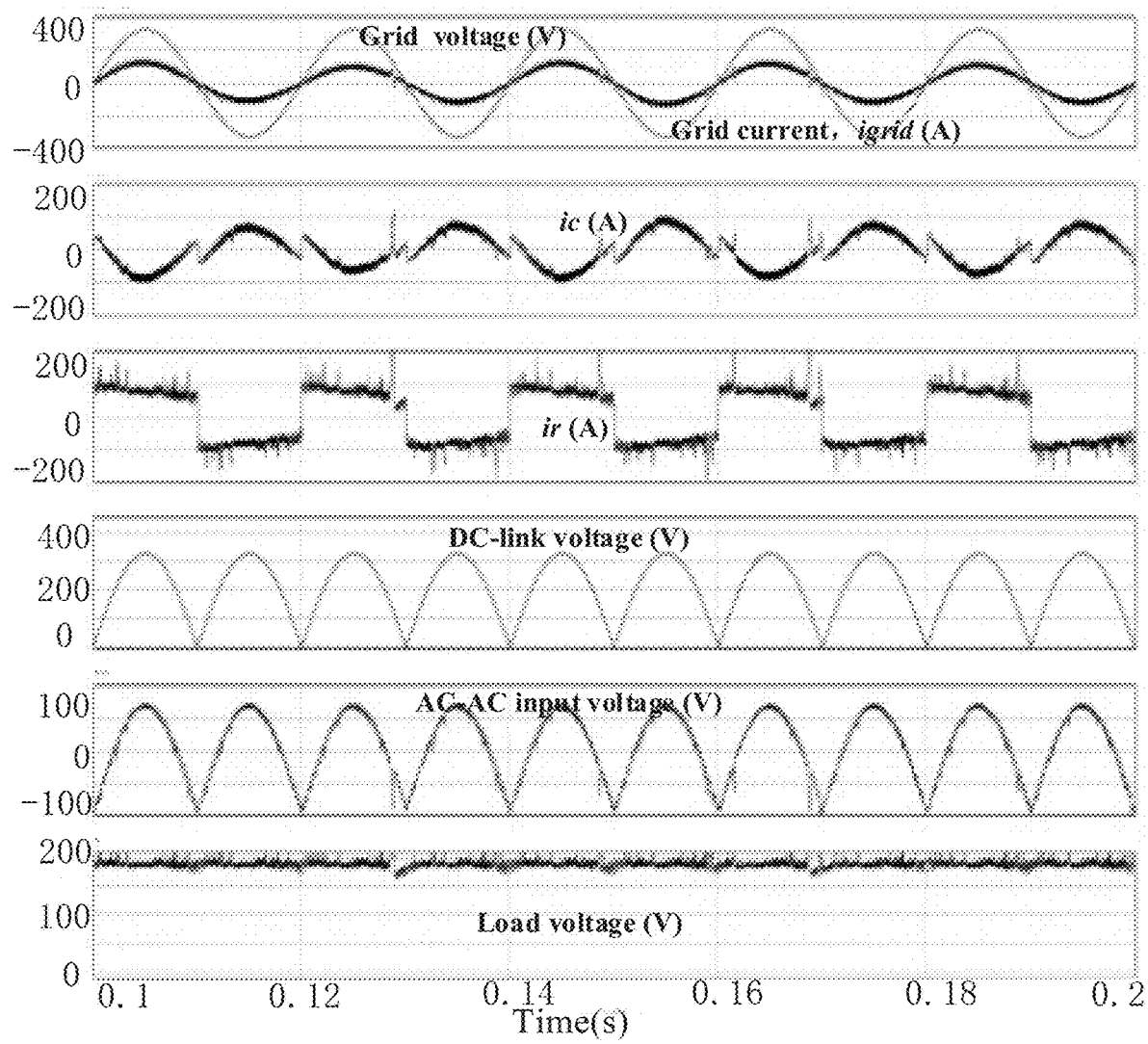

FIG. 11 shows simulation results for an embodiment of the presently disclosed AC-DC converter (100) according to FIG. 2B. The simulations show, from top to bottom, the grid voltage and current, the current $i_c$ current fed back from the AC-AC inverter, the current $i_r$ going to the AC-DC rectifier, the voltage over a DC-DC converter portion, the input voltage to the AC-AC converter, and the voltage over the load. According to a non-limiting example, the following parameters can be configured:

| Parameter | Value |
| --- | --- |
| AC input voltage | 230 V |
| Only high-frequency DC-link capacitor used | 50 µF |
| DC-link voltage, $V_{DC}$ | 207 V |
| Load current, $I_{load}$ (DC) | 40 A |
| Load voltage, $V_{load}$ (DC) | 190 V |
| Load power, $P_{load}$ | 7600 W |
| Input voltage to high-frequency link AC-AC inverter (average) | 17 V |
| High-frequency link AC-AC inverter power, $P_{acac}$ | 680 W |
| Switching frequency | 50 kHz |

Figure 12:
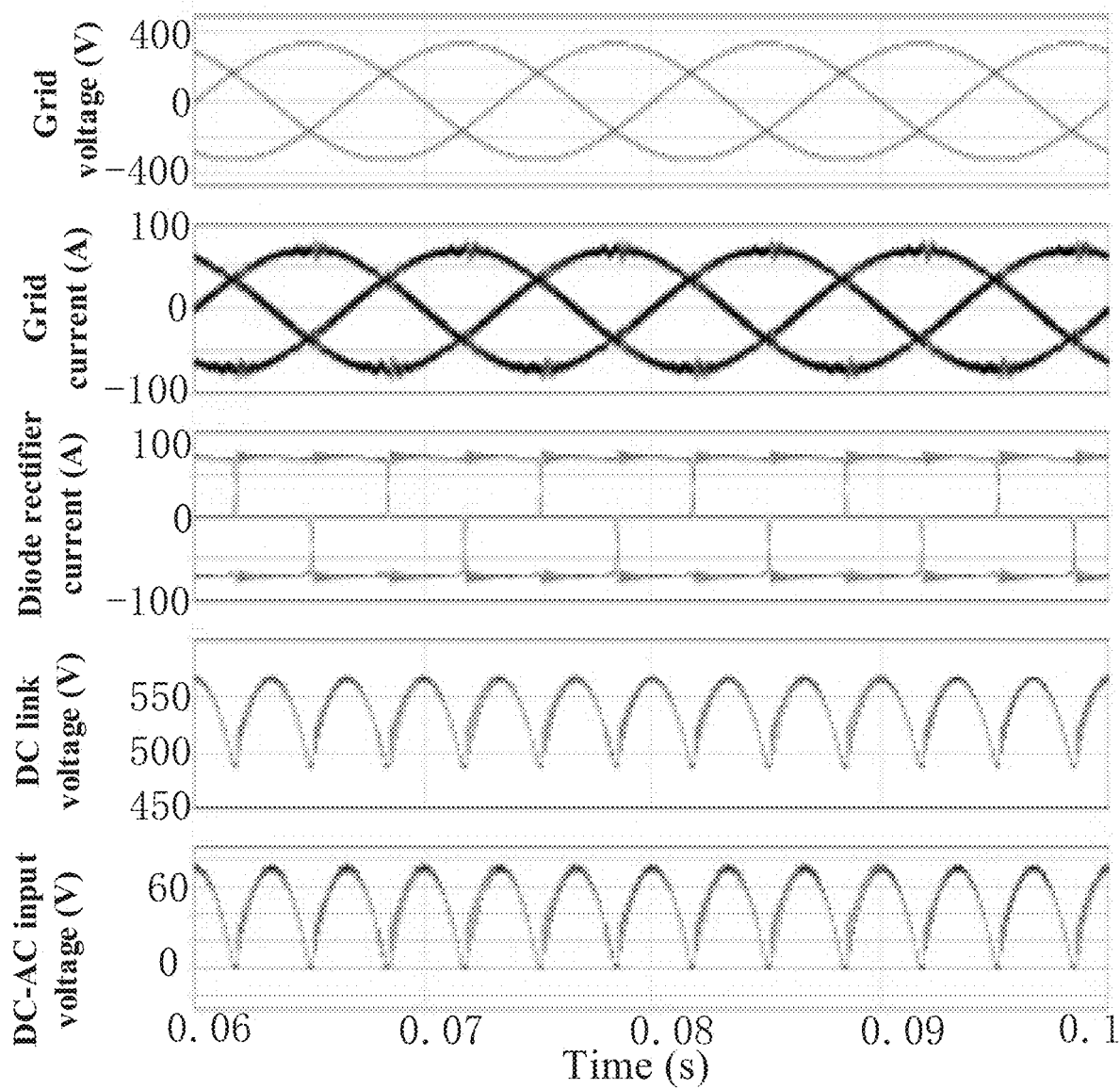

FIG. 12 shows simulation results for an embodiment of the presently disclosed AC-DC converter (100) according to FIG. 5B. The simulations show, from top to bottom, the grid voltage and current, the currents going to the AC-DC rectifier, the voltage over a DC-DC converter portion, and the input voltage to the DC-AC converter. According to a non-limiting example, the following parameters can be configured:

| Parameter | Value |
| --- | --- |
| AC input voltage (line-line RMS value) | 400 V |
| Only high-frequency DC-link capacitor used | 50 µF |
| DC-link voltage, $V_{DC}$ | 540 V |
| Load current, $I_{load}$ (DC) | 70 A |
| Load voltage, $V_{load}$ (DC) | 490 V |
| Load power, $P_{load}$ | 34300 W |
| Input voltage to high-frequency link DC-AC inverter (average) | 50 V |
| High-frequency link DC-AC inverter power, $P_{dcac}$ | 3500 W |
| Switching frequency | 50 kHz |

Figure 13:
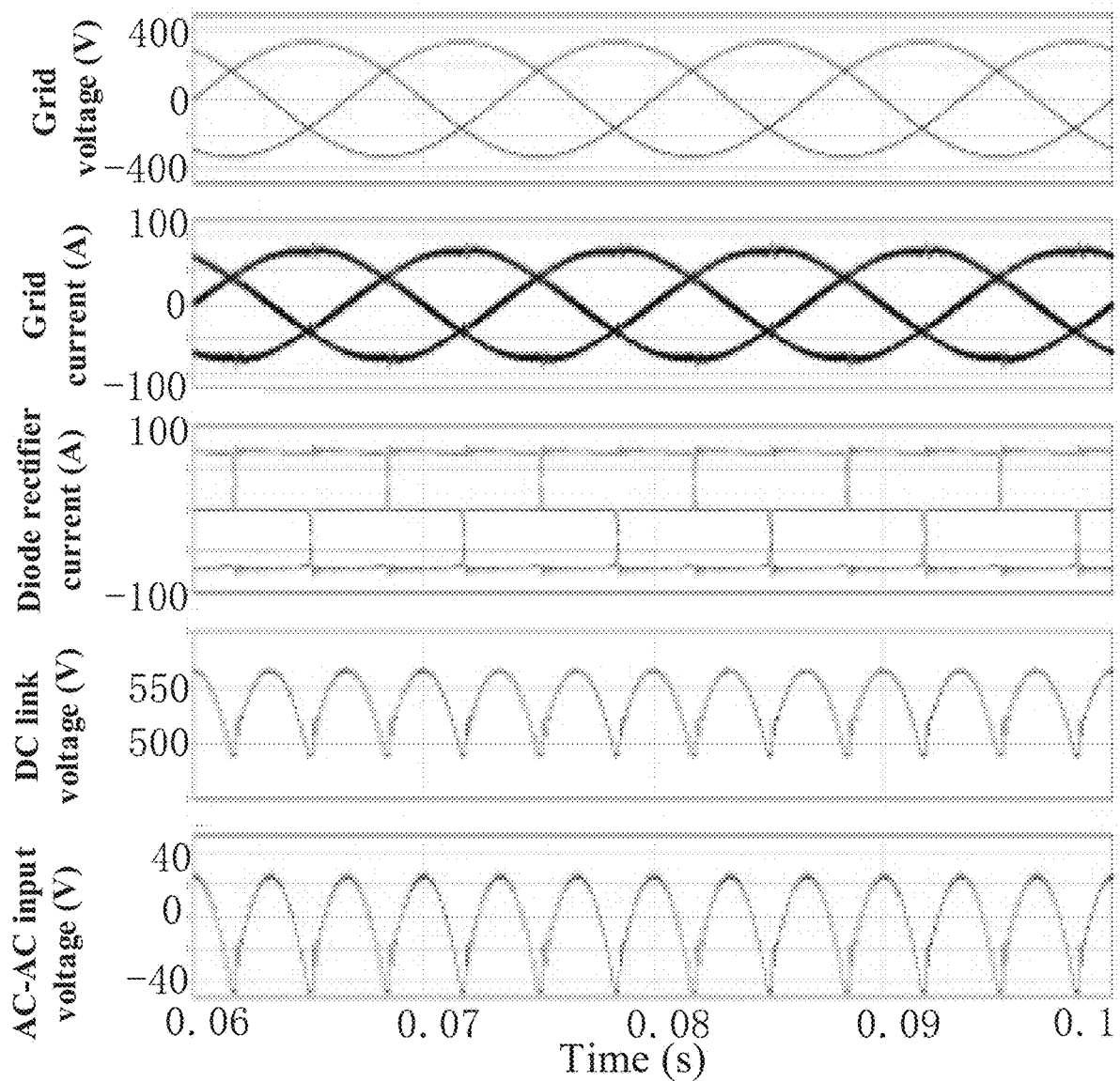

FIG. 13 shows simulation results for an embodiment of the presently disclosed AC-DC converter (100) according to FIG. 6B. The simulations show, from top to bottom, the grid voltage and current, the currents going to the AC-DC rectifier, the voltage over a DC-DC converter portion, and the input voltage to the AC-AC converter. According to a non-limiting example, the following parameters can be configured:

| Parameter | Value |
| --- | --- |
| AC input voltage (line-line RMS value) | 400 V |
| Only high-frequency DC-link capacitor used | 50 µF |
| DC-link voltage, $V_{DC}$ | 540 V |
| Load current, $I_{load}$ (DC) | 70 A |
| Load voltage, $V_{load}$ (DC) | 535 V |
| Load power, $P_{load}$ | 37450 W |
| Input voltage to high-frequency link AC-AC inverter (average) | 5 V |

| Parameter | Value |
| --- | --- |
| High-frequency link AC-AC inverter power, $P_{acac}$ | 350 W |
| Switching frequency | 50 kHz |

Figure 14:
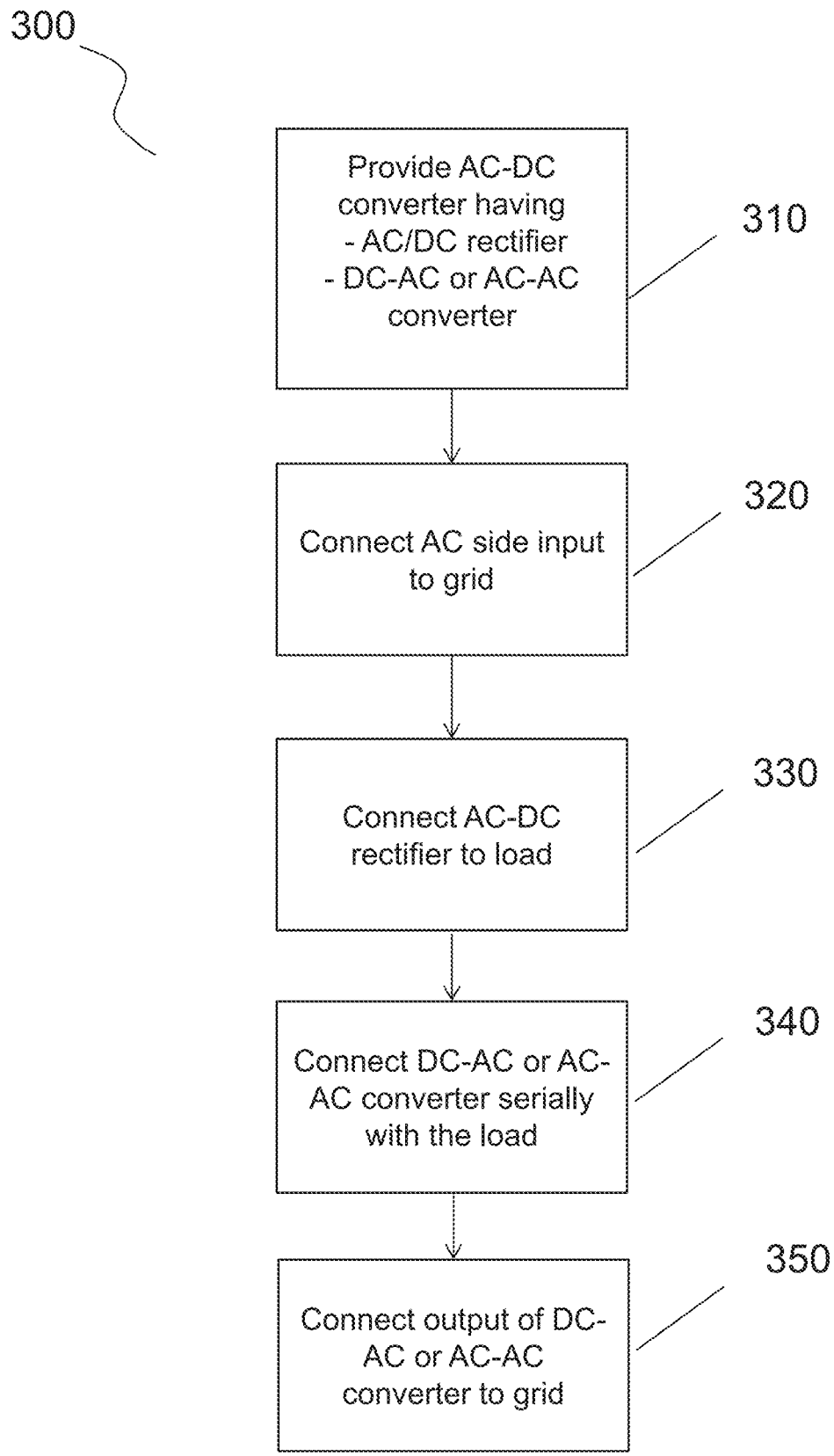
FIG. 14 shows a flow chart of a method according to embodiments of the presently disclosed method of supplying power to a load by an AC-DC converter

FIG. 14 shows a flow chart of a method (300) according to embodiments of the presently disclosed method of supplying power to a load by an AC-DC converter. The method (300) comprises the steps of:

providing an AC-DC converter having an AC side input port; a DC side output port; an AC-DC rectifier; and a DC-AC converter or an AC-AC converter (310);
connecting the AC side input port to a grid (320);
connecting the AC-DC rectifier to the load (330);
connecting the DC-AC converter or AC-AC converter serially with the load (340); and
connecting an output of the DC-AC converter or AC-AC converter to the grid (350).

FURTHER DETAILS OF THE INVENTION

1. An AC-DC converter comprising:
    an AC side input port;
    a first DC connection and a second DC connection defining a DC side output port connectable to a load;
    an AC-DC rectifier having an AC rectifier side connected to the AC side input port and a DC rectifier side comprising a first DC rectifier connection and a second DC rectifier connection, wherein the first DC rectifier connection is connected to the first DC connection;
    a DC-AC converter having a first DC input and a second DC input, wherein the first DC input is connected to the second DC connection, and a first AC output and a second AC output, wherein the first AC output and the second AC output are connected to the AC side input port.
2. An AC-DC converter comprising:
    an AC side input port;
    a first DC connection and a second DC connection defining a DC side output port connectable to a load;
    an AC-DC rectifier having an AC rectifier side connected to the AC side input port and a DC rectifier side comprising a first DC rectifier connection and a second DC rectifier connection, wherein the first DC rectifier connection is connected to the first DC connection;
    an AC-AC converter having a first AC input and a second AC input, wherein the first AC input is connected to the second DC connection, and a first AC output and a second AC output, wherein the first AC output and the second AC output are connected to the AC side input port.
3. The AC-DC converter according to item 1, further comprising a first capacitor connected between the first DC rectifier connection and the second DC rectifier connection.
4. The AC-DC converter according to any one of items 1 and 3, wherein the DC-AC converter comprises a DC-DC converter portion and a DC-AC inverter portion.
5. The AC-DC converter according to item 4, further comprising a second capacitor arranged between the DC-DC converter portion and a DC-AC inverter portion and connected parallel to the DC-DC converter portion and a DC-AC inverter portion.
6. The AC-DC converter according to any one of the preceding items, further comprising a control unit configured to control an operation of the AC-DC converter.
7. The AC-DC converter according to any one of the preceding items, wherein the AC-DC converter is configured to control a current through the load, preferably, wherein the DC-DC converter portion is configured to control the current through the load.
8. The AC-DC converter according to any one of the preceding items, wherein the AC-DC converter is configured to control an input current, preferably wherein the DC-AC inverter portion is configured to control the input current, for power factor correction.
9. The AC-DC converter according to any one of the preceding items, wherein the AC-DC converter is configured to control a DC voltage on the second capacitor, preferably wherein the DC-AC inverter portion is configured to control the DC voltage on the second capacitor.
10. The AC-DC converter according to any one of the preceding items, wherein the DC-AC converter is a high-frequency link DC-AC inverter or the AC-AC converter is a high-frequency link AC-AC inverter.
11. The AC-DC converter according to item 3, wherein the high-frequency link DC-AC inverter or the high-frequency link AC-AC inverter is configured to operate at a frequency greater than 10 kHz, preferably at a frequency greater than 20 kHz.
12. The AC-DC converter according to any one of items 1-2, further comprising a low-frequency transformer connected between the DC-AC converter or AC-AC converter and the AC side input port.
13. The AC-DC converter according to item 12, wherein the low-frequency transformer is configured to compensate for harmonics caused by the rectifier.
14. The AC-DC converter according to any one of items 12-13, wherein the low-frequency transformer is a 50 Hz or 60 Hz transformer.
15. The AC-DC converter according to any one of the preceding items, wherein the DC-AC converter or AC-AC converter is serially connected with the load.
16. The AC-DC converter according to any one of the preceding items, wherein a voltage is divided between the DC-AC converter or AC-AC converter and the load.
17. The AC-DC converter according to any one of the preceding items, wherein the converter is configured to feed real power and reactive power back to a grid connected to the AC side input port.
18. The AC-DC converter according to any one of the preceding items, wherein the AC-DC rectifier is a diode rectifier.
19. The AC-DC converter according to any one of the preceding items, wherein the AC-DC converter is a single-phase AC-DC converter.
20. The AC-DC converter according to any one of items 1-18, wherein the AC-DC converter is a three-phase AC-DC converter.
21. The AC-DC converter according to any one of the preceding items, wherein the AC-DC converter is a switched mode pulse width modulated AC-DC converter.
22. The AC-DC converter according to any one of the preceding items, wherein the AC-DC converter is configured to operate with a voltage greater than 200 V on the AC-DC rectifier, preferably with a voltage greater than 400 V on the AC-DC rectifier, more preferably with a voltage greater than 500 V on the AC-DC rectifier.

23. The AC-DC converter according to any one of the preceding items, wherein the AC-DC converter is configured to operate with a voltage greater than 200 V on the load, preferably with a voltage greater than 400 V on the load, more preferably with a voltage greater than 500 V on the load.

24. The AC-DC converter according to any one of the preceding items, wherein the AC-DC converter is configured to operate in high power applications, wherein a power operated by the load is greater than 50 W, preferably greater than 1 kW, more preferably greater than 5 kW.

25. A method of supplying power to a load by an AC-DC converter, the method comprising the steps of:
providing an AC-DC converter having an AC side input port; a DC side output port; an AC-DC rectifier; and a DC-AC converter or an AC-AC converter;
connecting the AC side input port to a grid;
connecting the AC-DC rectifier to the load;
connecting the DC-AC converter or AC-AC converter serially with the load; and
connecting an output of the DC-AC converter or AC-AC converter to the grid.

26. The method of supplying power to a load by an AC-DC converter according to item 25, comprising the step of feeding real power and reactive power back to the grid from the DC-AC converter or AC-AC converter.

27. The method of supplying power to a load by an AC-DC converter according to any one of items 25-26, comprising the step of regulating real power and reactive power at the AC side input port.

28. The method of supplying power to a load by an AC-DC converter according to item 27, wherein the step of regulating real and reactive power at the AC side input port is performed by controlling an operation of the DC-AC converter or AC-AC converter.

29. The method of supplying power to a load by an AC-DC converter according to any one of items 25-28, comprising the step of controlling the DC-AC converter or AC-AC converter such that a voltage and a current at the AC side input port are in phase.

30. The method of supplying power to a load by an AC-DC converter according to any one of items 25-29, wherein the AC-DC converter is the AC-DC converter according to any one of items 1-24.

The invention claimed is:

1. An AC-DC converter for at least one battery or electrolyze cell comprising:
an AC side input port;
a first DC connection and a second DC connection defining a DC side output port connectable to a load in the form of at least one battery or electrolyze cell;
an AC-DC rectifier having an AC rectifier side connected to the AC side input port and a DC rectifier side comprising a first DC rectifier connection and a second DC rectifier connection, wherein the first DC rectifier connection is connected to the first DC connection; and
a DC-AC converter connected in series with the load and having a first DC input and a second DC input, wherein the first DC input is connected to the second DC connection, and a first AC output and a second AC output, wherein the first AC output and the second AC output are connected to the AC side input port,
wherein a voltage is divided between the DC-AC converter and the load and wherein the converter is configured to feed real power and reactive power back to a grid connected to the AC side input port to achieve power factor correction.

2. An AC-DC converter for at least one battery or electrolyze cell comprising:
an AC side input port;
a first DC connection and a second DC connection defining a DC side output port connectable to a load in the form of at least one battery or electrolyze cell;
an AC-DC rectifier having an AC rectifier side connected to the AC side input port and a DC rectifier side comprising a first DC rectifier connection and a second DC rectifier connection, wherein the first DC rectifier connection is connected to the first DC connection; and
an AC-AC converter connected in series with the load and having a first AC input and a second AC input, wherein the first AC input is connected to the second DC connection, and a first AC output and a second AC output, wherein the first AC output and the second AC output are connected to the AC side input port.

3. The AC-DC converter according to claim 1, further comprising a first capacitor connected between the first DC rectifier connection and the second DC rectifier connection, wherein the DC-AC converter comprises a DC-DC converter portion and a DC-AC inverter portion.

4. The AC-DC converter according to claim 3, further comprising a second capacitor arranged between the DC-DC converter portion and a DC-AC inverter portion and connected parallel to the DC-DC converter portion and a DC-AC inverter portion.

5. The AC-DC converter according to claim 1, further comprising a control unit configured to control an operation of the AC-DC converter.

6. The AC-DC converter according to claim 3, wherein the AC-DC converter is configured to control a current through the load, preferably, wherein the DC-DC converter portion is configured to control the current through the load.

7. The AC-DC converter according to claim 3, wherein the AC-DC converter is configured to control an input current, preferably wherein the DC-AC inverter portion is configured to control the input current, for power factor correction.

8. The AC-DC converter according to claim 7, wherein the AC-DC converter is configured to control a DC voltage on the second capacitor, preferably wherein the DC-AC inverter portion is configured to control the DC voltage on the second capacitor.

9. The AC-DC converter according to claim 1, wherein the AC-DC rectifier is not actively controlled.

10. The AC-DC converter according to claim 1, wherein the DC-AC converter is a high-frequency link DC-AC inverter.

11. The AC-DC converter according to claim 10, wherein the high-frequency link DC-AC inverter is configured to operate at a frequency greater than 10 kHz.

12. The AC-DC converter according to claim 1, further comprising a low-frequency transformer connected between the DC-AC converter and the AC side input port.

13. The AC-DC converter according to claim 12, wherein the low-frequency transformer is configured to compensate for harmonics caused by the rectifier, preferably wherein the low-frequency transformer is a 50 Hz or 60 Hz transformer.

14. The AC-DC converter according to claim 1, wherein the AC-DC rectifier is a diode rectifier.

15. The AC-DC converter according to claim 14, wherein the diode rectifier is not actively controlled.

16. The AC-DC converter according to claim 1, wherein the AC-DC rectifier carries part of a load power to the load and the DC-AC converter carries part of the load power to the load.

17. The AC-DC converter according to claim 2, wherein a control unit is configured to control the AC-AC converter as an active rectifier.

18. The AC-DC converter according to claim 2, wherein a control unit is configured to control a load voltage delivered from the AC-DC rectifier to be as close as possible to a predetermined load voltage.

19. A method of supplying power to a load by an AC-DC converter, the method comprising the steps of:
 providing an AC-DC converter having an AC side input port; a DC side output port; an AC-DC rectifier; and a DC-AC converter or an AC-AC converter;
 connecting the AC side input port to a grid;
 connecting the AC-DC rectifier to the load;
 connecting the DC-AC converter or AC-AC converter serially with the load; and
 connecting an output of the DC-AC converter or AC-AC converter to the grid, wherein:
 a voltage is divided between the DC-AC converter or the AC-AC converter and the load, and
 the DC-AC converter or the AC-AC converter feeds real power and reactive power back to the grid connected to the AC side input port to achieve power factor correction.

20. The AC-DC converter according to claim 2, wherein the AC-AC converter is a high-frequency link AC-AC inverter configured to operate at a frequency greater than 10 KHz.

* * * * *